(12) United States Patent
Boen

(10) Patent No.: US 9,290,065 B2
(45) Date of Patent: Mar. 22, 2016

(54) SIDEWALL SUPPORT FOR A RUNFLAT TIRE

(71) Applicants: Compagnie Generale des Etablissements Michelin, Clermont-Ferrand (FR); Michelin Recherche et Technique S.A., Granges-Paccot (CH)

(72) Inventor: Sik Boen, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/655,448

(22) PCT Filed: Dec. 23, 2013

(86) PCT No.: PCT/US2013/077464
§ 371 (c)(1),
(2) Date: Jun. 25, 2015

(87) PCT Pub. No.: WO2014/105813
PCT Pub. Date: Jul. 3, 2014

(65) Prior Publication Data
US 2015/0352909 A1    Dec. 10, 2015

Related U.S. Application Data

(60) Provisional application No. 61/746,199, filed on Dec. 27, 2012.

(51) Int. Cl.
B60C 1/00    (2006.01)
B60C 17/00   (2006.01)
B60C 5/00    (2006.01)

(52) U.S. Cl.
CPC ............... B60C 17/009 (2013.04); B60C 5/00 (2013.01); *B60C 2001/0033* (2013.04)

(58) Field of Classification Search
CPC ........... C08L 9/00; C08L 7/00; B60C 17/009; B60C 5/00; B60C 2001/0033
See application file for complete search history.

(56) References Cited

U.S. PATENT DOCUMENTS

| | | | |
|---|---|---|---|
| 6,022,434 A | 2/2000 | Willard, Jr. et al. | |
| 7,066,225 B2 | 6/2006 | Rhyne et al. | |
| 7,789,119 B2 | 9/2010 | Agostini et al. | |
| 2002/0036043 A1* | 3/2002 | Thielen | B60C 1/0025 152/517 |
| 2009/0101263 A1 | 4/2009 | Nakamura | |
| 2012/0234452 A1* | 9/2012 | Miyazaki | B60C 1/00 152/541 |
| 2012/0296027 A1 | 11/2012 | Miyazaki | |

OTHER PUBLICATIONS

International Search Report with Written Opinion dated Apr. 16, 2014.

* cited by examiner

*Primary Examiner* — Alexander Kollias
(74) *Attorney, Agent, or Firm* — Frank J. Campigotto

(57) ABSTRACT

Run-flat tires having a sidewall support that is manufactured from particular rubber composition. These compositions are based upon a cross-linkable elastomer composition having, per 100 parts by weight of rubber, a polybutadiene rubber having a Mooney viscosity of between 55 and 85 and a low-surface area, high-structure carbon black. An additional second rubber component may also be included in the elastomer composition. The low-surface area, high-structure carbon black may be characterized as having a nitrogen surface area of between 15 $m^2/g$ and 25 $m^2/g$ and a COAN of between 65 ml/100 g and 85 ml/100 g.

11 Claims, No Drawings

SIDEWALL SUPPORT FOR A RUNFLAT TIRE

BACKGROUND OF THE INVENTION

1. Field of the Invention

This invention relates generally to tires and more specifically, materials for forming sidewall supports in a tire and such supports.

2. Description of the Related Art

Tire manufacturers have been developing solutions for how passengers in vehicles having pneumatic tires can continue on their journey for at least some minimum distance upon a tire losing all or substantially all of its pressure. While spare tires are one solution for such a problem, a better solution would allow the passengers to continue without having to get out of their vehicle until reaching a safe destination.

The idea of extended mobility allows a vehicle to continue to drive along on a tire that has lost all or substantially all of its inflation for at least a reasonable distance. Such tires, based on run-flat technology, often include a self-supporting feature that allows the tires to support a significant load at reduced pressure or even no pressure. Such self-supporting feature may include a tire sidewall that is reinforced with rubber inserts as shown, for example, in U.S. Pat. No. 6,022,434, which is hereby fully incorporated by reference.

Because the rubber inserts have to be able to support the load of the vehicle at a reduced or no inflation pressure, these inserts are often quite thick and they typically impact the rolling resistance characteristics of the tire. Researchers in the tire industry are searching for new materials and new designs for such sidewall supports to improve the rolling resistance of such tires and their durability when operated under no or little pressure.

SUMMARY OF THE INVENTION

Particular embodiments of the present invention include sidewall supports and tires having such sidewall supports that have, in some embodiments, improved characteristics such as, for example, improved endurance and improved rolling resistance as compared to other tires and supports.

Embodiments include run-flat tires having a sidewall support that is manufactured from particular rubber compositions. These compositions are based upon a cross-linkable elastomer composition having, per 100 parts by weight of rubber, a polybutadiene rubber having a Mooney viscosity of between 55 and 85 and a low-surface area, high-structure carbon black. An additional second rubber component may also be included in the elastomer composition. The low-surface area, high-structure carbon black may be characterized as having a nitrogen surface area of between 15 $m^2/g$ and 25 $m^2/g$ and a COAN of between 65 ml/100 g and 85 ml/100 g.

In particular embodiments, the second rubber component may be natural rubber or may be selected from polybutadienes (BR), polyisoprenes (IR), natural rubber (NR), butadiene copolymers, isoprene copolymers and mixtures of these elastomers. The low-surface area, high-structure carbon black may be included in the elastomer composition in an amount of between 30 phr and 100 phr.

DETAILED DESCRIPTION OF PARTICULAR EMBODIMENTS

Particular embodiments of the present invention include sidewall supports and materials from which they may be manufactured, the sidewall supports being useful in tires and especially in pneumatic tires that are designed to operate for at least a reasonable distance with no or little inflation pressure. The sidewall supports disclosed herein may be described as having low rigidity and low hysteresis, a combination of attributes that provides a run-flat tire having improved rolling resistance and improved durability over the other tires now known in the industry.

The improved characteristics of rolling resistance and durability of the tires having the sidewall supports described herein were surprisingly obtained by the combination of materials included in the rubber composition used for manufacturing the sidewall supports. Such rubber compositions include a polybutadiene rubber having a high Mooney viscosity combined with a second rubber component and a high-structure, low-surface area carbon black.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

Reference will now be made in detail to embodiments of the invention. Each example is provided by way of explanation of the invention. For example, features illustrated or described as part of one embodiment can be used with another embodiment to yield still a third embodiment. It is intended that the present invention include these and other modifications and variations.

Use of sidewall supports in the sidewalls of tires designed to run for a reasonable distance under low or no-inflation pressure, i.e., run-flat tires, are well known in the industry. Often these sidewall supports are crescent-shaped and they are designed to allow the run-flat tire to support the load of the vehicle for a reasonable distance so that the car can reach a safer location for changing and/or inflating the tire.

It is recognized that the size, thickness and other dimensions of such sidewall supports may vary based, inter alia, on the size and type of the tire and the load that the tire needs to support while in the run-flat condition. It is recognized that one having ordinary skill in the field of tire design can provide a run-flat tire having the sidewall supports manufactured with the materials disclosed herein.

As noted above, particular embodiments of the present invention include sidewall supports and tires having such sidewall supports manufactured from a rubber composition that includes a polybutadiene rubber having a high Mooney viscosity (sometimes referred to as Mooney plasticity) in the range of between 55 and 85, a second rubber component and a high-structure, low-surface area carbon black.

Polybutadiene rubber is a well-known rubber that is made by polymerizing the 1,3-butadiene monomer. Because of the two double bonds present in the butadiene monomer, the resulting polybutadiene may include three different forms: cis-1,4, trans-1,4 and vinyl-1,2 polybutadiene. The cis-1,4 and trans-1,4 elastomers are formed by the monomers connecting end-to-end while the vinyl-1,2 elastomer is formed by the monomers connecting between the ends of the monomer.

A polybutadiene that is characterized as having a high Mooney viscosity is typically one having a higher molecular weight and therefore, Mooney viscosity is somewhat an indicator of the relative molecular weight of the polybutadienes; i.e., the higher the Mooney viscosity, the higher the molecular weight. Mooney viscosity is measured in Mooney units, which is an arbitrary unit used to measure the viscosity of unvulcanized rubber. The measurement is taken in a Mooney viscometer, as well known to one skilled in the art, in accordance with the standard ASTM D-1646. All the Mooney viscosities disclosed herein are measured at 100° C.

It is the use of a polybutadiene having a high Mooney coupled with the high-structure, low-surface area carbon black in a rubber composition that provides the surprising results with a sidewall support manufactured from such material. The Mooney viscosity (in Mooney units measured at 100° C.) of such polybutadiene is between 55 Mooney units and 85 Mooney units for particular embodiments of the rubber compositions disclosed herein or alternatively the Mooney viscosity may be between 55 Mooney units and 75 Mooney units, between 55 Mooney units and 70 Mooney units, between 60 Mooney units and 70 Mooney units or between 60 Mooney units and 80 Mooney units.

It may be noted that in particular embodiments of the rubber compositions disclosed herein, the polydispersity index is less than 2.5 or alternatively less than 2, between 1 and 2.5 or between 1 and 2. The polydispersity index is defined as the ratio of the weight average molecular weight (Mw) to the number average molecular weight (Mn). As is well known, the Mw and the Mn may be determined relative to polystyrene standards using gel permeation chromatography (GPC).

In addition to the polybutadiene being characterized as having a high Mooney viscosity, particular embodiments of the rubber compositions disclosed herein may be characterized as having a high cis-1,4 content. Therefore, in particular embodiments the polybutadiene may be characterized as having a cis-1,4 content of at least 80% or at least 90 or alternatively, between 80% and 99%, between 90% and 99% or between 92% and 99%.

Suitable polybutadienes are available on the market and may be obtained, for example, from Lanxess, having offices in Orange, Tex. For example Lanxess provides Buna CB 21, a solution high-cis BR having a Mooney viscosity of 73 and a cis-1,4 content of at least 96%. Buna CB 22 is a solution high-cis BR having a Mooney viscosity of 63 and a cis-1,4 content of at least 96%.

In addition to the high-Mooney polybutadiene, the rubber compositions disclosed herein further include a second rubber component resulting at least in part, i.e., a homopolymer of a copolymer, from diene monomers, i.e., monomers having two double carbon-carbon bonds, whether conjugated or not.

These diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %.

Examples of suitable conjugated dienes include, in particular, 1,3-butadiene, 2-methyl-1,3-butadiene, 2,3-di($C_1$-$C_5$ alkyl)-1,3-butadienes such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Examples of vinyl-aromatic compounds include styrene, ortho-, meta- and para-methylstyrene, the commercial mixture "vinyltoluene", para-tert-butylstyrene, methoxystyrenes, chloro-styrenes, vinylmesitylene, divinylbenzene and vinyl naphthalene.

The copolymers may contain between 20 wt. % and 90 wt. % of diene units and between 1 wt. % and 80 wt. % of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, random, sequential or microsequential elastomers, and may be prepared in dispersion or in solution; they may be coupled and/or starred or alternatively functionalized with a coupling and/or starring or functionalizing agent.

Examples of suitable diene elastomers include polyisoprenes and butadiene/styrene copolymers, particularly those having a styrene content of between 5 wt. % and 50 wt. % or of between 20 wt. % and 40 wt. % and in the butadiene faction, a content of 1,2-bonds of between 4 mol. % and 65 mol. %, a content of trans-1,4 bonds of between 20 mol. % and 80 mol. %. Also included are butadiene/isoprene copolymers, particularly those having an isoprene content of between 5 wt. % and 90 wt. % and a glass transition temperature (Tg, measured in accordance with ASTM D3418) of −40° C. to −80° C.

Further included are isoprene/styrene copolymers, particularly those having a styrene content of between 5 wt. % and 50 wt. % and a Tg of between −25° C. and −50° C. In the case of butadiene/styrene/isoprene copolymers, examples of those which are suitable include those having a styrene content of between 5 wt. % and 50 wt. % and more particularly between 10 wt. % and 40 wt. %, an isoprene content of between 15 wt. % and 60 wt. %, and more particularly between 20 wt. % and 50 wt. %, a butadiene content of between 5 wt. % and 50 wt. % and more particularly between 20 wt. % and 40 wt. %, a content of 1,2-units of the butadiene fraction of between 4 wt. % and 85 wt. %, a content of trans-1,4 units of the butadiene fraction of between 6 wt. % and 80 wt. %, a content of 1,2-plus 3,4-units of the isoprene fraction of between 5 wt. % and 70 wt. %, and a content of trans-1,4 units of the isoprene fraction of between 10 wt. % and 50 wt. %, and more generally any butadiene/styrene/isoprene copolymer having a Tg of between −20° C. and −70° C.

In summary, suitable diene elastomers as the second rubber component for particular embodiments of the present invention include highly unsaturated diene elastomers such as polybutadienes (BR), polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). In particular embodiments, the second rubber component is limited to NR.

The second rubber component added in particular embodiments of the compositions disclosed herein is included, inter alia, to provide the necessary tack to the rubber composition.

Use of a tackifying resin is limited or excluded from particular embodiments because such resins may raise the hysteresis of the rubber composition and increased hysteresis would raise the temperature of the insert under the run-flat running conditions.

Particular embodiments of the rubber compositions disclosed herein may include only one diene elastomer in addition to the high-Mooney polybutadiene rubber and/or a mixture of several diene elastomers. It may be noted that particular embodiments may contain only highly unsaturated elastomers with other types of elastomers being explicitly excluded.

The rubber compositions that are suitable for manufacturing the sidewall inserts may include, for particular embodiments, between 40 phr and 90 phr of the high Mooney BR or alternatively between 45 phr and 85 phr, between 50 phr and 80 phr, between 50 phr and 60 phr or between 45 phr and 65 phr of the high Mooney BR, the remainder of the rubber being the second rubber component. As noted above, in particular embodiments the second rubber component may be limited to NR.

In addition to the rubber, the rubber compositions disclosed herein further include a high-structure, low-surface area carbon black as the reinforcing filler. Reinforcing fillers are added to rubber compositions to, inter alia, improve their tensile strength and wear resistance. It has been found by the inventors that the combination of the high Mooney polybutadiene coupled with the high-structure, low-surface area carbon black reinforcing filler provides the surprising results that give the improved properties of less rolling resistance and improved durability to the tires having the sidewall supports manufactured from the rubber compositions disclosed herein.

Carbon black may best be described as being made up of very fine particulate aggregates wherein the very fine particles are fused together to form the aggregates. The aggregates that are formed by these very fine particles can vary greatly between the different types of carbon blacks. Those blacks having aggregates that have a higher particle count with the particles joined into more chain-like clusters having a narrow core, often with random branching, are characterized as having a higher structure as compared to those in general having a lower particle count, less branched and more compact.

Common properties that are measured and are useful in describing a carbon black include surface area measurements, which are indicative of the particle size and the oil adsorption number (OAN) that is indicative of the structure of the carbon black. A similar test may be performed on a compressed sample of carbon black (COAN) that also provides an indication of the structure of the black.

One known method of determining the surface area of a carbon black is the ASTM Standard D6556 for determining the total and external surface area by nitrogen adsorption. A method for determining the oil adsorption number is the ASTM Standard D2414 for determining the oil adsorption number using dibutyl phthalate while ASTM Standard D3493 is the standard test for determining the COAN of a carbon black.

Particular embodiments of the rubber compositions disclosed herein include a carbon black having a nitrogen surface area as determined using the ASTM Standard D6556 test method of between 15 $m^2/g$ and 25 $m^2/g$ or alternatively, between 17 $m^2/g$ and 22 $m^2/g$. These surface areas are typical for carbon blacks having a low surface area.

But in addition to having a low surface area, carbon blacks useful for the rubber compositions disclosed herein are also characterized as being of high structure. Useful carbon blacks may further be characterized as having an OAN as determined by ASTM D2414 of between 100 ml/100 g and 150 ml/100 g or alternatively, between 110 ml/100 g and 150 ml/100 g, between 120 ml/100 g and 150 ml/100 g, between 125 ml/100 g and 145 ml/100 g or between 130 ml/100 g and 140 ml/100 g.

In particular embodiments of the rubber compositions disclosed herein, useful carbon blacks may be characterized as having a COAN as determined by ASTM D3493-09 of between 65 ml/100 g and 85 ml/100 g or alternatively between 70 ml/100 g and 80 ml/100 g.

Useful high-structure, low-surface area carbon blacks for particular embodiments of the rubber compositions disclosed herein may be characterized as having a nitrogen surface area in a range as disclosed above and either a COAN in a range as described above or an OAN in a range as described above to provide a carbon black that may be characterized as having both a low-surface area and a high structure. In other particular embodiments, useful carbon blacks may be characterized as having each of the above characteristics, i.e., nitrogen surface area, OAN and COAN, within a range as described above.

Surface activity of a carbon black may also be indicated by the difference between the nitrogen surface area and the iodine number (ASTM D1510). The iodine number is a measurement of the adsorption of iodine by the carbon black and is also used as a measure of the surface area. Higher activity blacks tend to have a positive difference while less active blacks tend to have a negative number. In particular embodiments, the high-structure, low surface area carbon blacks may have an iodine number of between 10 mg/g and 25 mg/g or alternatively between 15 mg/g and 23 mg/g or 18 mg/g and 21 mg/g.

Particular embodiments of the rubber compositions disclosed herein may include between 30 phr and 100 phr of the high-structure, low-surface area carbon black or alternatively, between 35 phr and 80 phr, between 40 phr and 75 phr or between 40 phr and 60 phr of the carbon black.

An example of a suitable high-structure, low-surface area carbon black that is available on the market is S204, available from Orion Engineered Carbon with offices in Kingwood, Tex. This carbon black has a nitrogen surface area of 19 $m^2/g$, an OAN of 138 ml/100 g, a COAN of 76 ml/100 g and an iodine number of 19.6 mg/g.

Particular embodiments of the rubber compositions disclosed herein may include other components known to those skilled in the art such as, for example, curing agents, various processing aids, antidegradants, antioxidants or combinations thereof in quantities as known to those having ordinary skill in the art. Curing agents that may be included in the elastomer composition of the present invention include, for example, sulfur, sulfur donors, activators, accelerators, peroxides, and other systems used to effect vulcanization of the elastomer composition.

The rubber compositions disclosed herein may be described as being low rigidity compositions with low hysteresis. As such, particular embodiments of the rubber compositions disclosed herein may be characterized as having an elongation modulus MA10 at a temperature of 23° C. of between 5.5 MPa and 7 MPa or alternatively between 6 MPa and 7 MPa. Furthermore, for particular embodiments, the rubber compositions may be characterized as having hysteresis losses as measured at 60° C. in percent rebound of less than 8% or alternatively, less than 7%. In particular embodiments it is preferred that the hysteresis losses be as low as possible so that the sidewall insert may run as cool as possible under run-flat conditions.

Flexometer measurements are useful for determining whether the certain materials may be useful for the manufacture of run-flat sidewall inserts. Using a flexometer in accordance with ASTM D623 (Heat Generation and Flexing Fatigue in Compression), the internal temperature and percent creep of the test piece subjected to repeated compression over the test cycle may be measured. If the test piece failed (blowout) from the repeated compression before the end of the three hours, a flex inner temperature was not taken. For particular embodiments of the materials disclosed herein and with similar modulus of elongation as disclosed herein, the materials may be characterized as having a percent creep of less than 5% or alternatively, less than 4.5% or less than 4%. For particular embodiments of the materials disclosed herein, the materials may be characterized as having an internal temperature at the end of the test cycle (if the test piece did not fail during the test) of less than 175° C. or alternatively less than 170° C. or less than 165° C. The test conditions pertaining to the flexometer are disclosed below along with the other testing procedures.

The rubber compositions that are disclosed herein may be produced in suitable mixers, such as internal mixers or extruders, in a manner known to those having ordinary skill in the art. Typically two successive preparation phases may be utilized, a first phase of thermo-mechanical working at a high temperature followed by a second phase of mechanical working at a lower temperature.

The first phase of thermo-mechanical working (sometimes referred to as the "non-productive" phase) is intended to mix thoroughly, by kneading, the various ingredients of the compositions with the exception of the vulcanization system, particularly the vulcanizing agents. It is carried out in a suitable mixer until, under the action of the mechanical working and the high shearing imposed on the mixture, a maximum temperature is reached, generally between 120° C. and 190° C. or more narrowly, between 130° C. and 170° C.

After cooling the mixture, a second phase of mechanical working is implemented at a lower temperature. Sometimes referred to as the "productive" phase, this finishing phase consists of incorporation by mixing the vulcanization system, in a suitable device such as an open mill. It is performed for an appropriate time, typically between one and thirty minutes, for example between two and ten minute, and at a sufficiently low temperature lower than the vulcanization temperature of the mixture so as to protect against premature vulcanization.

After the mixing is complete, the rubber composition can be formed into useful articles, including the sidewall supports of run-flat tires. After being formed into its initial shape for being incorporated into the tire and then being incorporated into the tire during the tire building process, the tire is then cured, typically under heat and pressure, to produce the run-flat tire product having a sidewall support insert.

The invention is further illustrated by the following examples, which are to be regarded only as illustrations and not delimitative of the invention in any way. The properties of the compositions disclosed in the examples were evaluated as described below and those utilized methods are suitable for measurement of the claimed and/or described properties of the present invention.

Mooney Viscosity ML (1+4): Mooney Viscosity was measured in accordance with ASTM Standard D1646-04. In general, the composition in an uncured state is placed in a cylindrical enclosure and heated to 100° C. After 1 minute of preheating, the rotor turns within the test sample at 2 rpm, and the torque used for maintaining this movement is measured after 4 minutes of rotation. The Mooney Viscosity is expressed in "Mooney units."

Modulus of elongation (MPa) was measured at 10% (MA10) and at 100% (MA100) at a temperature of 23° C. based on ASTM Standard D412 on dumb bell test pieces. The measurements were taken in the second elongation, i.e., after an accommodation cycle. These measurements are secant moduli in MPa based on the original cross section of the test piece.

Hysteresis losses were measured in percent by rebound at 60° C. at the sixth impact in accordance with the following equation:

$$HL\ (\%) = 100\{(W_0 - W_1)/W_1\},$$

wherein $W_0$ is the energy supplied and $W_1$ is the energy restored.

Flexometer measurements were taken using a DOLI Ultimate Flexometer manufactured by DOLI Industrie Electronik GMBH of Germany following ASTM test method D-623 (Heat Generation and Flexing Fatigue in Compression) on test pieces that were 25 mm in height with a 17.8 mm diameter. The test was run for three hours at which time an internal temperature of the test piece was recorded as the flex inner temperature. If the test piece failed (blowout) from the repeated compression before the end of the three hours, a flex inner temperature was not taken. The test was run with a chamber temperature of 90° C., with a pre-stress of 2 MPa applied and a stroke of 25% (6.25 mm) at a frequency of 30 Hz. The difference in height of the test piece at the beginning of the test and at the end of the test expressed as a percent of the original height is the flex percent creep.

The tire endurance measurements were made in accordance with ISO 16992 for run-flat extended mobility. The tires were run on a test drum at 80 km/h with a load of 65% load index, e.g., 670 kg for the 255/55R18 XL tires. The tires were run until failure and the total distance up to failure was recorded as the endurance result. Failure was defined as the tire internal temperature rising above 150° C., the tire visibly smoking I the test cell or the deformed section height of the tire decreased by more than 20% of its original height.

Rolling resistance of the tires was measured on a test drum in accordance with the ISO 18164 method.

Example 1

Rubber compositions were prepared using the components shown in Table 1. The amount of each component making up the rubber compositions shown in Table 1 are provided in parts per hundred parts of rubber by weight (phr). The tin-functionalized BR (Nipol BR 1250H) used in the comparative example C1 had a Mooney viscosity of 50 and a cis-1,4 content of 35%. The non-functionalized BR (Lanxess, Buna CB21) used in the comparative example C2 and formulations F1 and F2 had a Mooney viscosity of 75 and a cis-1,4 content of 96%. The non-functionalized BR (Lanxess, Buna CB24) used in the comparative examples C3 and C4 had a Mooney viscosity of 44 and a cis-1,4 content of 96%. The non-functionalized BR (Lanxess, Buna CB22) used in formulation F3 had a Mooney viscosity of 63 and a cis-1,4 content of 96%.

The high-structure, low-surface area carbon black was S204 obtained from Orion Engineered Carbons. It had a nitrogen surface area of 19 m²/g, an OAN of 138 ml/100 g, a COAN of 76 ml/100 g and an iodine number of 19.6 mg/g.

TABLE 1

Rubber Formulations and Physical Properties

| Formulations | C1 | C2 | C3 | C4 | F1 | F2 | F3 |
|---|---|---|---|---|---|---|---|
| NR | 50 | 35 | 50 | 35 | 50 | 35 | 50 |
| BR, tin f | 50 | | | | | | |
| BR, Mooney 44 | | | 50 | 65 | | | |
| BR, Mooney 63 | | | | | | | 50 |
| BR, Mooney 75 | | 65 | | | 50 | 65 | |
| N650 CB | 50 | 50 | | 50 | | | |
| S204 CB | | | 50 | | 50 | 50 | 50 |
| Oil | | 2 | | | | 2 | |
| Additives | 9 | 9 | 9 | 8 | 9 | 9 | 9 |
| Cure Package | 6.2 | 6.2 | 6.2 | 5.5 | 6.2 | 6.2 | 6.2 |
| Physical Properties | | | | | | | |
| MA10 @23° C. | 6.6 | 6.4 | 6.4 | 6.5 | 6.3 | 6.6 | 6.2 |
| MA100 @ 23° C. | 4.9 | 4.3 | 4.6 | 4.7 | 4.5 | 4.7 | 4.3 |
| Hysteresis Loss, % rebound | 5.9 | 6.4 | 5.6 | 6.5 | 5.2 | 5.0 | 5.5 |
| Flex creep, % | 4.5 | 14 | 6.9 | 23 | 3.3 | 2.9 | 3.9 |
| Flex, Inner Temp, ° C. | 186 | 211 | 170 | 227 | 161 | 158 | 164 |

The oil used in formulation C2 was a paraffinic oil. The additive package was a typical package including 6PPD, zinc oxide, stearic acid and TMQ. The cure package included accelerators and insoluble sulfur.

The rubber compositions were prepared in a Banbury mixer by mixing the components given in Table 1, except for the cure package, in a mixer until all components were well dispersed and a temperature of between 130° C. and 170° C. was reached. The cure package was added in a second phase on a mill. Curing was effected at 150° C. for twenty-five minutes. The rubber compositions were then prepared for testing and tested to measure their physical properties, the results of which are shown in Table 1.

One comparative example C1 included a functionalized elastomer using a standard N650 carbon black typical for such applications. C2 switched the functional BR with a non-functional BR having a high Mooney viscosity but the results were poor with a flex creep of 14%. C3 and C4 indicated a poor result using a low viscosity Mooney with the highly-structured, low surface area carbon black in the case of C3 but even worse results in the case of C4 using N650 carbon black. The formulations F1 to F3 provide good results using the highly-structured, low surface area carbon black with the high Mooney viscosity BR.

Example 2

Tires were built using the rubber compositions C3, C4 and F2 as described in Example 1. Two set of tires were produced, one set being 255/55R18 XL tires and the other set being 225/50R17 tires. The tires were test for rolling resistance and endurance by the methods described above. The results are provided in Table 2.

TABLE 2

Tire Test Results

| Formulations | C3 | C4 | F2 |
|---|---|---|---|
| 225/55R18 XL | | | |
| Rolling Resistance, kg/t | 10.5 | 10.9 | 10.5 |
| Endurance, km | 66 | 47 | 78 |
| 225/50R17 | | | |
| Rolling Resistance, kg/t | 9.0 | 9.0 | 8.8 |
| Endurance, km | 132 | 123 | 188 |

As demonstrated by the results, tire produced with the higher Mooney BR and the low-surface area, high-structure carbon black had improved rolling resistance and improved endurance.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A run-flat tire having a sidewall support, the sidewall support manufactured from a rubber composition that is based upon a cross-linkable elastomer composition, the cross-linkable elastomer composition comprising, per 100 parts by weight of rubber:
    a polybutadiene rubber having a Mooney viscosity of between 55 and 85;
    a second rubber component; and
    a low-surface area, high-structure carbon black having a nitrogen surface area of between 15 $m^2/g$ and 25 $m^2/g$ and a COAN of between 65 ml/100 g and 85 ml/100 g.

2. The run-flat tire of claim 1, wherein the second rubber component is natural rubber.

3. The run-flat tire of claim 1, wherein the cross-linkable elastomer composition comprises between 30 phr and 100 phr of the low-surface area, high-structure carbon black.

4. The run-flat tire of claim 1, wherein an OAN of the low-surface area, high-structure carbon black is between 100 ml/100 g and 150 ml/100 g.

5. The run-flat tire of claim 1, wherein an iodine number of the low-surface area, high-structure carbon black is between 10 mg/g and 25 mg/g.

6. The run-flat tire of claim 1, wherein the Mooney viscosity of the polybutadiene rubber is between 55 Mooney units and 75 Mooney units.

7. The run-flat tire of claim 1, wherein the cross-linkable elastomer composition comprises between 40 phr and 90 phr of the polybutadiene rubber.

8. The run-flat tire of claim 1, wherein the second rubber component is selected from the group consisting of polybutadienes, polyisoprenes, natural rubber, butadiene copolymers, isoprene copolymers and mixtures thereof.

9. The run-flat tire of claim 1, wherein the nitrogen surface area of the carbon black is between 17 $m^2/g$ and 22 $m^2/g$, the COAN is between 70 ml/100 g and 80 ml/100 g and the iodine number is between 15 mg/g and 23 mg/g.

10. The run-flat tire of claim 1, wherein the cross-linkable elastomer composition comprises between 45 phr and 80 phr of the polybutadiene rubber.

11. The run-flat tire of claim 10, wherein the polybutadiene rubber is in an amount of between 50 phr and 80 phr.

* * * * *